UNITED STATES PATENT OFFICE.

CHARLES CATLETT, OF STAUNTON, VIRGINIA.

REVIVIFYING BONE-BLACK.

SPECIFICATION forming part of Letters Patent No. 617,080, dated January 3, 1899.

Application filed May 3, 1897. Serial No. 634,975. (No specimens.)

*To all whom it may concern:*

Be it known that I, CHARLES CATLETT, of Staunton, in the county of Augusta and State of Virginia, have invented a new and useful Improvement in the Manufacture and Use of Decolorizing and Filtering Material, of which the following is a full, clear, and exact description.

The object of my invention is, primarily, to increase the life and the efficiency of bone-charcoal, fullers' earth, clays, and other similar materials used for filtering and decolorizing purposes.

Having recognized the fact that the life of bone-charcoal and similar material as extended under the well-known system of revivification is limited largely by the accumulation in the pores of the material of an excess of carbon and that more carbon is often contained in new bone-charcoal than is desirable for most efficient work, I have discovered that this excess of carbon can be removed to a greater or less extent by reheating the above materials after being revivified or freshly manufactured, as the case may be, in closed retorts or ordinary revivifying-kilns in which provision is made to prevent admission of air. If after the above reheating the material is cooled by the methods common in the ordinary processes of manufacture and revivification and again reheated, a second portion of carbon is removed, and thus by successive reheatings, if one is not sufficient, the amount of carbon can be reduced to any point desired. I have also discovered that this destruction of more or less carbon is largely due to the oxygen which such material when new or revivified has the power of condensing in its pores, and that therefore the destruction of carbon takes place in all parts of the material, such exposure of the material to the air as occurs in ordinary handling being sufficient to insure absorption of oxygen. I have also discovered that the amount of oxidation is a function of the time and temperature of heating and may be modified within the scope of my invention, and, as will be plain to those familiar with the art, by such modifications the amount of carbon removed can be greatly varied. While the removal of an excess of carbon commences to take place at a very low temperature, any temperature may be used short of injury to the framework of the material.

I shall now describe the best mode I know for application of my invention in practice, premising that those skilled in the art may modify the same within the limits of my claim.

In a sugar-refinery, after testing to see approximately the amount of carbon destroyed under the ordinary working of the kiln by one passage of new or revivified charcoal through it, it is only necessary when the excess of carbon as shown by analysis has reached this amount to pass the material after revivification and cooling in the usual way a second time through the kiln, when the amount of carbon will be found reduced to approximately the first figure. For instance, suppose that the bone-charcoal contained nine per cent. of carbon originally, and it having been shown by experiment that the amount of carbon destroyed by passing the bone-charcoal a single time through the kiln as worked at this refinery amounted to .75 per cent., and suppose that on the twenty-fifth revivification the total carbon was found to have been increased to 9.75 per cent., it would only be necessary to pass the revivified char a second time through the kiln heated and worked in the usual way, when the carbon would be again reduced to approximately the original figure.

I claim—

The method herein described of preparing and revivifying spent filtering material which consists in charring the same, cooling and exposing it to air and subsequently reducing the carbon contents of the material by reheating the same in a retort closed to prevent admission of air, whereby a portion of the carbon is consumed by action of the oxygen contained within the pores of the material.

CHARLES CATLETT.

Witnesses:
RICHD. P. BELL,
R. H. CATLETT.